(12) United States Patent
Dowling et al.

(10) Patent No.: US 8,082,991 B2
(45) Date of Patent: Dec. 27, 2011

(54) MONITORING AND CONTROL SYSTEM FOR A GAS WELL DEWATERING PUMP

(75) Inventors: Michael A. Dowling, Houston, TX (US); Jason Kamphaus, Missouri City, TX (US); Harryson Sukianto, Missouri City, TX (US); Alain P. Dorel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 422 days.

(21) Appl. No.: 12/388,542

(22) Filed: Feb. 19, 2009

(65) Prior Publication Data

US 2010/0211226 A1   Aug. 19, 2010

(51) Int. Cl.
*E21B 43/12* (2006.01)
(52) U.S. Cl. .............. 166/250.03; 166/372; 700/281
(58) Field of Classification Search ............ 166/250.03, 166/370, 372, 68; 700/281, 282
See application file for complete search history.

(56) References Cited

U.S. PATENT DOCUMENTS

| | | | |
|---|---|---|---|
| 2,708,411 A | 5/1955 | Richardson | |
| 2,834,300 A | 5/1955 | Brock | |
| 2,941,629 A | 6/1960 | Rohacs | |
| 3,183,972 A | 5/1965 | Fredd | |
| 3,589,838 A | 6/1971 | Tuzson | |
| 3,912,009 A | 10/1975 | Davis, Jr. | |
| 4,043,390 A | 8/1977 | Glotin | |
| 4,184,515 A | 1/1980 | Streich et al. | |
| 4,317,485 A | 3/1982 | Ross | |
| 4,598,630 A | 7/1986 | Kao | |
| 4,688,999 A | 8/1987 | Ames et al. | |
| 5,188,517 A | 2/1993 | Koster | |
| 5,203,172 A | 4/1993 | Simpson et al. | |
| 5,229,017 A | 7/1993 | Nimerick et al. | |
| 5,577,890 A | 11/1996 | Nielsen et al. | |
| 5,778,978 A | 7/1998 | Crow | |
| 5,871,051 A | 2/1999 | Mann | |
| 5,961,841 A | 10/1999 | Bowers | |
| 6,000,468 A | 12/1999 | Pringle | |
| 6,017,198 A | 1/2000 | Traylor et al. | |
| 6,044,909 A | 4/2000 | Gano | |
| 6,069,118 A | 5/2000 | Hinkel et al. | |
| 6,089,322 A | 7/2000 | Kelley et al. | |

(Continued)

FOREIGN PATENT DOCUMENTS

GB   2099043 A   12/1982

(Continued)

OTHER PUBLICATIONS

Dowling, Michael A. et al, "Overpressure Protection in Gas Well Dewatering Systems", U.S. Appl. No. 12/372,962, filed Feb. 18, 2009.

(Continued)

*Primary Examiner* — William P Neuder
(74) *Attorney, Agent, or Firm* — Jim Patterson

(57) ABSTRACT

A monitoring and control system for a dewatering pump configured to dewater a gas well is provided. A dewatering pump is driven at a first speed to pump fluid out of a well annulus. A fluid level detection device is configured to identify a change of fluid level in the well annulus occurring between a first time and a second, later time. A controller is configured to change the speed of the dewatering pump from the first speed to a second speed based upon the identified change in fluid level. Several embodiments of the fluid level detection devices are provided.

54 Claims, 7 Drawing Sheets

U.S. PATENT DOCUMENTS

| | | | |
|---|---|---|---|
| 6,140,277 | A | 10/2000 | Tibbles et al. |
| 6,140,817 | A | 10/2000 | Flaum et al. |
| 6,196,309 | B1 | 3/2001 | Estilette, Sr. |
| 6,508,310 | B1 | 1/2003 | Mioduszewski et al. |
| 6,569,814 | B1 | 5/2003 | Brady et al. |
| 6,638,896 | B1 | 10/2003 | Tibbles et al. |
| 6,660,693 | B2 | 12/2003 | Miller et al. |
| 6,720,290 | B2 | 4/2004 | England et al. |
| 6,837,309 | B2 | 1/2005 | Boney et al. |
| 6,854,515 | B2 | 2/2005 | Matthews et al. |
| 6,915,854 | B2 | 7/2005 | England et al. |
| 6,964,299 | B2 | 11/2005 | Scarsdale |
| 7,005,765 | B1 | 2/2006 | Schulz et al. |
| 7,124,819 | B2 | 10/2006 | Ciglenec et al. |
| 7,380,608 | B2 | 6/2008 | Geier |
| 7,726,404 | B2 | 6/2010 | Kubala et al. |
| 2004/0060705 | A1 | 4/2004 | Kelley |
| 2004/0084178 | A1 | 5/2004 | Reid |
| 2006/0083645 | A1 | 4/2006 | Simmons |
| 2007/0023191 | A1 | 2/2007 | Dreggevik |
| 2007/0227732 | A1 | 10/2007 | Miller et al. |
| 2007/0251704 | A1 | 11/2007 | Reimert et al. |
| 2009/0217992 | A1 | 9/2009 | Wilson |
| 2010/0096129 | A1 | 4/2010 | Hinkel et al. |
| 2010/0206544 | A1 | 8/2010 | Dowling et al. |
| 2010/0206549 | A1 | 8/2010 | Dowling et al. |
| 2010/0206568 | A1 | 8/2010 | Dowling et al. |
| 2010/0209265 | A1 | 8/2010 | Dowling et al. |
| 2010/0211226 | A1 | 8/2010 | Dowling et al. |

FOREIGN PATENT DOCUMENTS

| | | |
|---|---|---|
| GB | 2339914 A | 2/2000 |
| GB | 2436576 A | 10/2007 |
| GB | 2457784 A | 9/2009 |
| WO | 2010096303 A1 | 8/2010 |
| WO | 2010096431 A1 | 8/2010 |
| WO | 2010096481 A1 | 8/2010 |

OTHER PUBLICATIONS

Dowling, Michael A. et al, "Gas Well Dewatering System", U.S. Appl. No. 12/388,098, filed Feb. 18, 2009.

Dowling, Michael A. et al, "Devices, Systems, and Methods for Equalizing Pressure in a Gas Well", U.S. Appl. No. 12/388,211, filed Feb. 18, 2009.

Dowling, Michael A. et al, "Integrated Cable Hanger Pick-Up System", U.S. Appl. No. 12/388,323, filed Feb. 18, 2009.

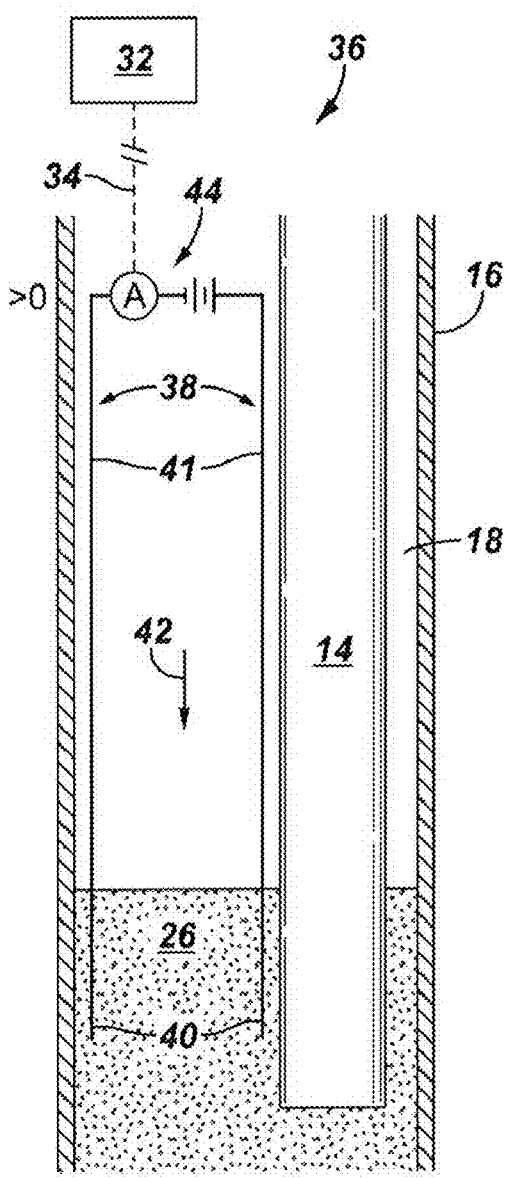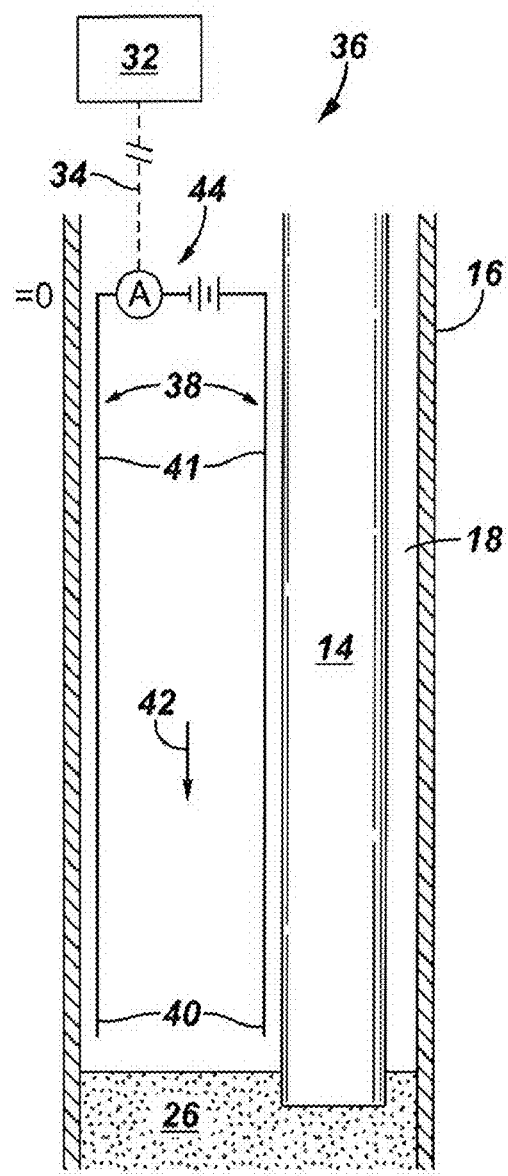

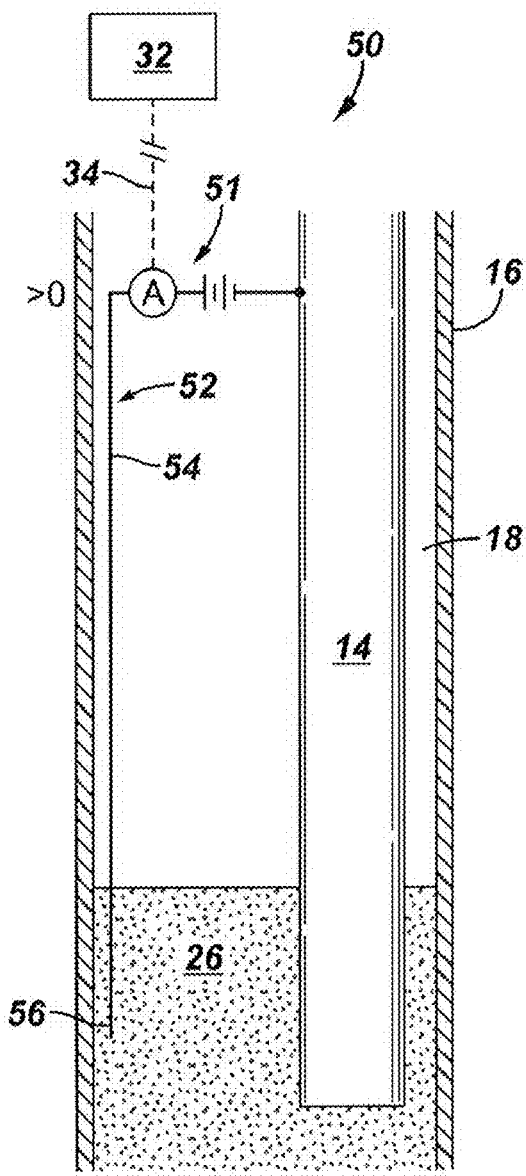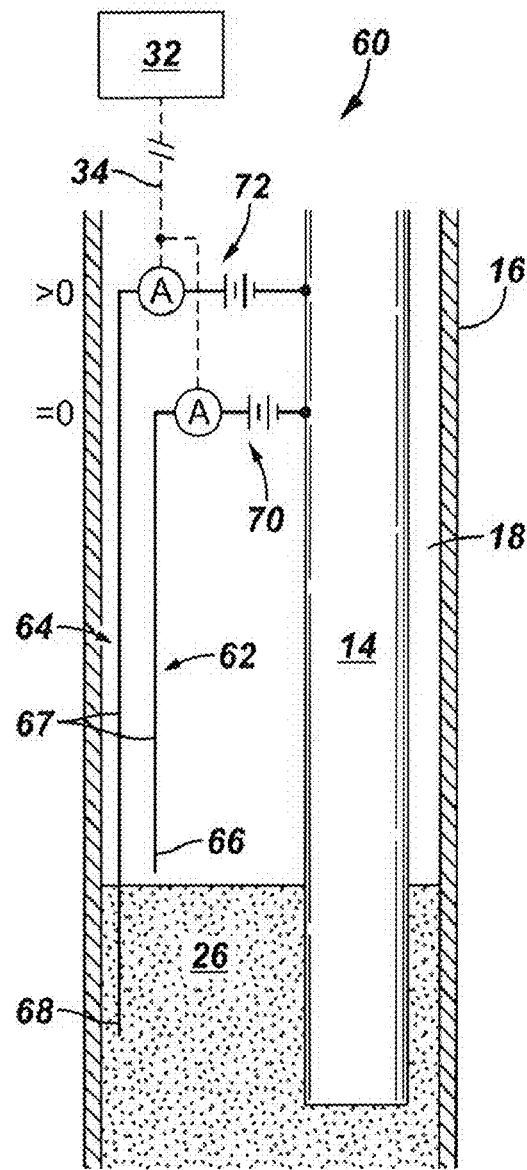

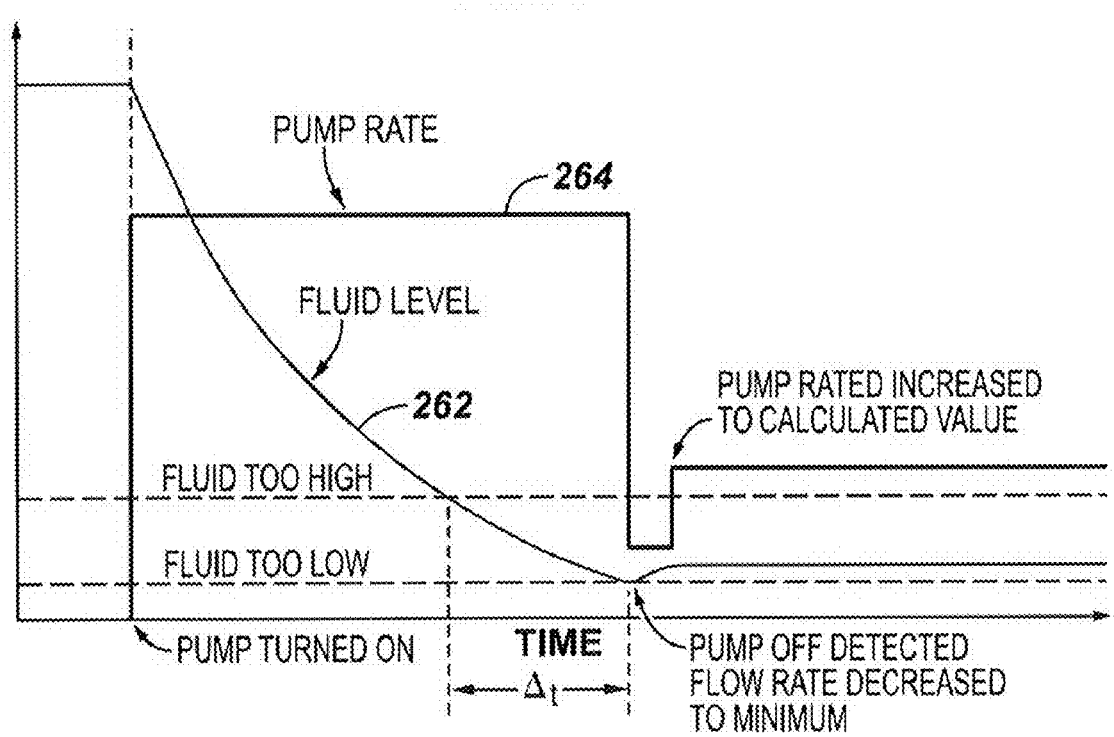

MONITORING AND CONTROL SYSTEM FOR A GAS WELL DEWATERING PUMP

FIELD

The present application relates generally to monitoring and control systems for gas well dewatering pumps. More particularly, the present application relates to monitoring of conditions within a gas well and controlling pump flow rate from a dewatering pump to maintain optimal pumping conditions in the well.

BACKGROUND

Hydrocarbons and other fluids are often contained within subterranean formations at elevated pressures. Wells drilled into these formations allow the elevated pressure within the formation to force the fluids to the surface. However, in low pressure formations, or when the formation pressure has diminished, the formation pressure may be insufficient to force fluids to the surface. In these cases, a positive displacement pump, such as a piston pump, can be installed to provide the required pressure to produce the fluids.

The function of pumping systems in gas wells is to produce fluid (generally water) that enters the well bore naturally with the gas. This is typically necessary only on low flow rate gas wells. In high flow rate gas wells, the velocity of the gas is usually sufficient that it carries the water to the surface. In low flow rate gas wells, the water accumulates in the well bore and restricts the flow of gas. By pumping out the water, the pump allows the well to flow at a higher gas rate, and this additional produced gas, which eventually is related to additional revenue, pays for the pumping unit.

Positive displacement pumps operate at a fixed volume rate. For a given pump geometry (stroke, diameter), the speed of the pump must be changed in order to change the flow rate of the pump.

SUMMARY

The present application recognizes that there are at least two problems with existing gas well dewatering pumps, namely (1) there is currently no practical way to know the flow rate requirement for a well before the pump is installed and (2) the volume flow rate will change over time. In view of these identified problems, the present application further recognizes that it is desirable to provide a self-optimizing monitoring and control system that is configurable to control the speed of the pumping system based upon identified conditions within the well. Ideally, such a system would also ensure that fluid level within the well is maintained at low levels, to thereby obtain consistent high gas flow rate from the well. Dependable, fluid level detection is necessary for such a system to function properly.

The present application discloses embodiments including such a self-optimizing monitoring and control system for a dewatering pump configured to dewater a gas well over time. In one example, the system includes a dewatering pump that is driven at (at least) first and second speeds to pump fluid out of a well annulus. A fluid level detection device is configured to identify a change of fluid level in the well annulus occurring between a first time period and a second, later time period. A controller is configured to change the speed of the dewatering pump from the first speed to the second speed based upon the identified change in fluid level. The controller can further be configured to change the speed of the dewatering pump based upon the identified change in fluid level and the elapsed time between the first time period and second time period. The controller can be further configured to repeat these steps to optimize volume pumping rate over time.

The fluid level detection device can include different configurations. In one example, the fluid level detection device includes an intake formed in production tubing disposed in the gas well and connected to the dewatering pump. The intake is located uphole of a primary entry for the tubing. In this example, the controller is configured to detect a change in operation of the dewatering pump caused by gas entering the production tubing via the intake when the fluid level in the well annulus drops below the location of the intake in the downhole direction. For example, the controller can be configured to detect a change in the amperage of a motor driving the dewatering pump, caused by air flowing through the intake. The controller is further configured to change the speed of the dewatering pump (for example from the first speed to the second speed) when the change in operation of the dewatering pump is detected.

In another example, the fluid level detection device includes one or more fluid level sensor wires positioned in the well annulus. For example, a single fluid level sensor wire can be positioned in the well annulus and spaced apart from the production tubing such that a decrease in fluid level in the well annulus from a location that is uphole of a non-insulated end of the fluid level sensor wire to a location that is downhole of the non-insulated end of the fluid level sensor wire opens a circuit formed between the sensor wire and the production tubing. Opening the circuit alerts the controller regarding the decrease in fluid level. A similar operation can be employed when the fluid level in the well annulus increases from a location that is downhole of the non-insulated end of the fluid level sensor wire to a location that is uphole of the non-insulated end of the fluid level sensor wire and closes the circuit between the fluid level sensor wire and the production tubing, thus alerting the controller regarding the increase in fluid level.

In other examples, the fluid level detection device includes two or more fluid level sensor wires having ends that either substantially aligned in the downhole direction of the well annulus or that are offset in the downhole direction of the well annulus to provide fluid level indications to the controller upon which the dewatering pump can be controlled.

BRIEF DESCRIPTION OF THE DRAWINGS

The best mode is described hereinbelow with reference to the following drawing figures.

FIG. 2 is a schematic view of a fluid level detection device including a pair of sensor wires disposed in a well annulus, wherein fluid level in the annulus is located uphole of non-insulated ends of the sensor wires.

FIG. 3 is a schematic view of the fluid level detection device shown in FIG. 2, wherein fluid level is located downhole of the ends of the sensor wires.

FIG. 4 is a schematic view of a fluid level detection device including a single sensor wire disposed in a well annulus, wherein fluid level in the annulus is located uphole of a non-insulated end of the sensor wire.

FIG. 5 is a schematic view of a fluid level detection device having a pair of sensor wires disposed in a well annulus, wherein fluid level in the annulus is located uphole of a non-insulated end of one of the sensor wires and downhole of a non-insulated end of the other of the sensor wires.

FIG. 12 is a graph showing two cycles followed according to the method shown in FIG. 11.

DETAILED DESCRIPTION OF THE DRAWINGS

In the following description, certain terms have been used for brevity, clearness, and understanding. No unnecessary limitations are to be implied therefrom beyond the requirement of the prior art because such terms are used for descriptive purposes only and are intended to be broadly construed. The different systems and methods described herein may be used alone or in combination with other systems or methods. It is to be expected that various equivalents, alternatives, and modifications are possible within the scope of the appended claims.

Figure 1:
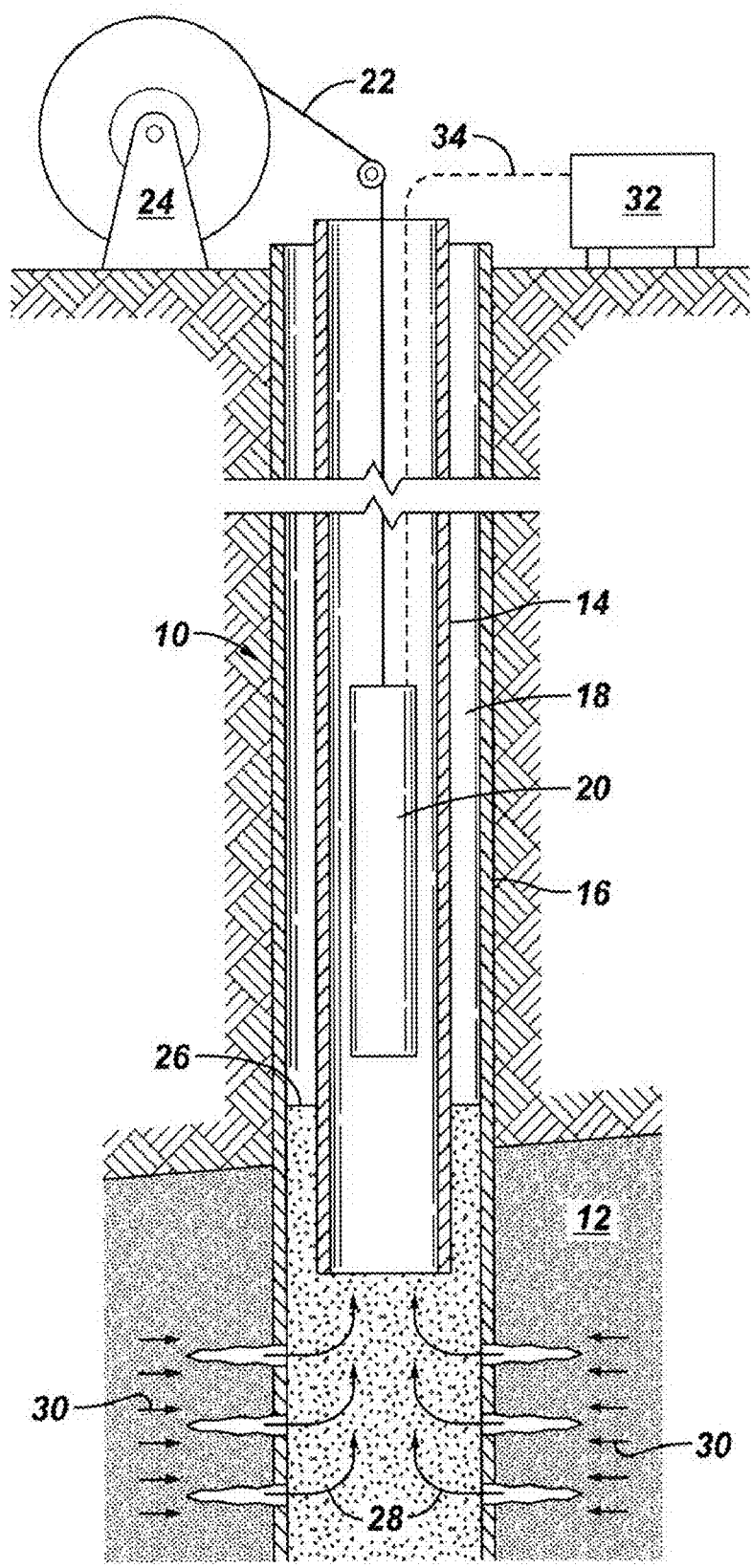
FIG. 1 is a schematic view of a control system for a dewatering pump configured to dewater a gas well.

FIG. 1 depicts a gas well 10 extending down into a subterranean formation 12. The gas well 10 includes a production tube 14 extending downhole and surrounded by tubing or casing 16. The outer circumference of the production tube 14 and the inner circumference of the casing 16 define a well annulus 18. A dewatering pump 20 is installed in the production tube 14 and supported by convention means, such as for example by a cable 22 and winch 24 arrangement. Fluid 26 enters the well annulus 18 from the formation 12 in the direction of arrows 30 during the lifetime of the well 10. The dewatering pump 20 is configured to pump fluid 26 up out of the well annulus 18 via the production tube 14 in the direction shown by arrows 28. It is desirable to pump the fluid 26 at a rate sufficient to maintain the level of fluid 26 in the well annulus 18 at a minimum and to thereby maximize the amount of gas production from the well 10.

A controller 32 having a storage medium wherein a set of executable code is stored is provided and is placed in communication with the dewatering pump 20. The controller 32 is configured to execute the set of executable code to carry out a series of process steps, such as the method steps shown in FIGS. 9-12 and described herein below. The controller 32 communicates with the dewatering pump 20 via a wired or wireless communication link, such as for example via cable 34. The controller 32 is also connected to a fluid level detection device configured to identify a change of fluid level in the well annulus 18. Preferred examples of the fluid level detection device are depicted in FIGS. 2-8 and described hereinbelow.

FIGS. 2 and 3 depict a fluid level detection device 36 that includes a pair of fluid level sensor wires 38 having lower ends 40 that are substantially aligned with each other in the downhole direction 42. The wires 38 have body portions 41 that are insulated from other electrically conductive materials, such as production tube 14 and casing 16, etc. The lower ends 40 of the wires are not insulated and are therefore exposed to the well fluid 26 when fluid level in the well rises above the ends 40 (see e.g. FIG. 2). The wires 38 are connected to each other by a standard (normally closed) relay 44. The device 36 is connected to the controller 32 via the communication link 34.

As depicted in FIG. 2, when the level of the fluid 26 in the well annulus 18 rises above the lower ends 40 of the wires 38, the fluid 26 contacts and conducts current between the ends 40, as shown by the charge symbol in FIG. 2. This closes a circuit between the wires 38. When the level of fluid 26 in the well annulus 18 lowers below the respective ends 40, as shown in FIG. 3, the fluid falls and does not contact the ends 40 and does not conduct current between the ends 40. This opens the circuit between the wires 38. The "open" or "closed" condition of the circuit formed by the wires 38 and relay 44 is communicated to the controller 32 via the communication link 34. By monitoring the circuit condition, the controller 32 is thereby alerted to increases and decreases in fluid level in the well annulus 18 above and below the ends 40 of the wires 38. Based upon these changes in fluid level, the controller 32 is configured to change the speed of the dewatering pump 20, according the processes further described hereinbelow.

FIG. 4 depicts another example of a fluid level detection device 50 that includes a single fluid level sensor wire 52 positioned in the well annulus 18 and spaced apart from the production tube 14. The wire 52 is connected to the production tube 14 by a standard relay 51. The wire 52 has an insulated body portion 54 and a non-insulated lower end 56. The device 50 is connected to the controller 32 via the communication link 34. According to this example, a decrease in the fluid level in the well annulus 18 from a location that is uphole of the end 56 (FIG. 4) to a location that is downhole of the end 56 (not shown) opens a circuit formed between the fluid level sensor wire 52 and the production tube 14. Similarly, an increase in fluid level in the well annulus 18 from a location that is downhole of the end 56 (not shown) to a location that is uphole of the end 56 (FIG. 4) opens a circuit formed between the fluid level sensor wire 52 and the production tube 14 as shown by the charge symbol. By monitoring the circuit condition, the controller 32 is thereby alerted to increases and decreases in fluid level in the well annulus 18 above and below the end 56 of the wire 52. Based upon these changes in fluid level, the controller 32 is configured to change the speed of the dewatering pump 20, according the processes further described hereinbelow.

FIG. 5 depicts another example of a fluid level detection device 60 which includes two fluid level sensor wires 62, 64 positioned in the well annulus 18. The wires 62, 64 each have an insulated body portion 67 and respective lower ends 66, 68. The device 60 is connected to the controller 32 via the communication link 34. Lower end 66 is offset from and located uphole of lower end 68. Each sensor wire 62, 64 is connected to the production tube 14 by a standard relay 70, 72 and forms a circuit with the production tube 14 when fluid is located intermediate the respective and 66, 68 and the production tube 14. According to this example, a decrease in the fluid level in the well annulus 18 from a location that is uphole of the end 66 to a location that is downhole of the end 66 (FIG. 5) opens a circuit formed between the fluid level sensor wire 62 and the production tube 14. A further decrease in the fluid level in the well annulus 18 from a location that is uphole of the end 68 to a location that is downhole of the end 68 opens a circuit formed between the fluid level sensor wire 64 and the production tube 14. Similarly, an increase in fluid level in the well annulus 18 from a location that is downhole of the end 68 to a location that is uphole of the end 68 (FIG. 5) closes a circuit formed between the fluid level sensor wire 64 and the production tube 14. Further increase in fluid level in the well annulus 18 from a location that is downhole of the end 66 to a location that is uphole of the end 68 closes the circuit formed between the fluid level sensor wire 62 and the production tube 14.

By monitoring the condition of circuits formed by the wires 62, 64 and production tube 14, the controller 32 is thereby alerted to increases and decreases in fluid level in the well annulus 18 above and below the ends 66, 68 of the wires 62, 64. Based upon these changes in fluid level, the controller 32 is configured to change the speed of the dewatering pump 20, according the processes further described hereinbelow.

The fluid level detection device 60 provides multi-point measurement capability. For example, opening of the circuit formed between the end 68 and the production tube 14 is a low point measurement that can indicate when fluid level in the well annulus 18 is too low. Closing of the circuit formed between the end 66 and the production tube 14 is a high point measurement that can indicate when the fluid level in the well annulus 18 is too high. For the too high measurement system, the normal bias is an open circuit and a closed circuit indicates a problem. Thus the preferred circuit status would be a closed circuit between the end 68 and the production tube 14 and an open circuit between the end 66 and the production tube 14. It should also be understood that in an alternate embodiment the circuits formed by ends 66 and 68 could be formed between further ends of wires according to the example shown in FIGS. 2 and 3, rather than with the production tubing.

Figure 6:
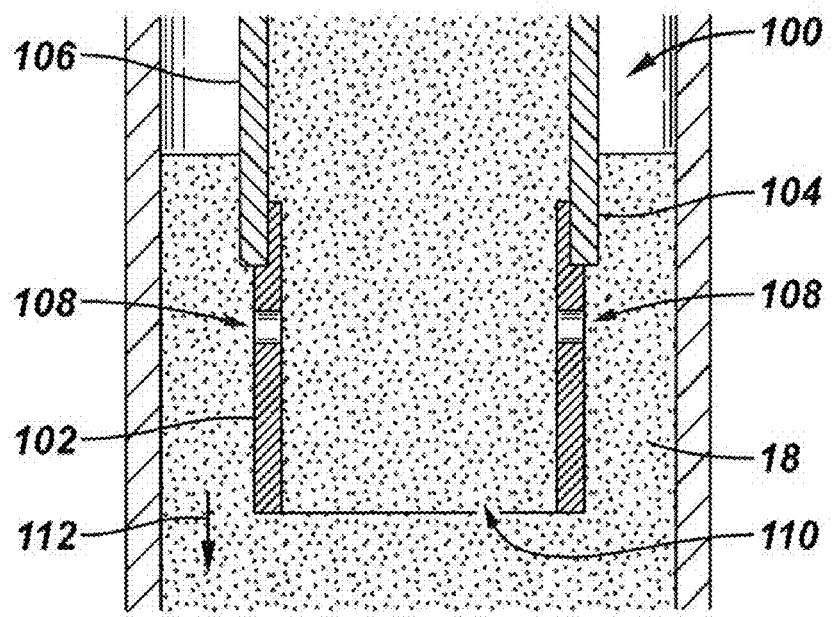
FIG. 6 is a schematic view of portions of a well annulus and fluid level detection device formed in a pipe extension on production tubing for the dewatering pump, wherein fluid level in the annulus is located uphole of intakes formed in the pipe extension.
Figure 7:
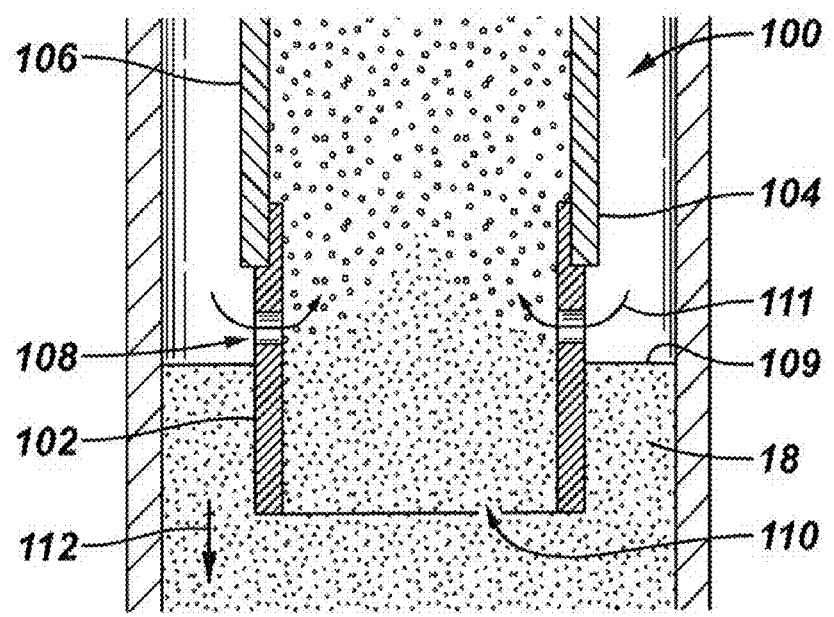
FIG. 7 is a schematic view of the example shown in FIG. 6, wherein the fluid level is located downhole of the intakes.
Figure 8:
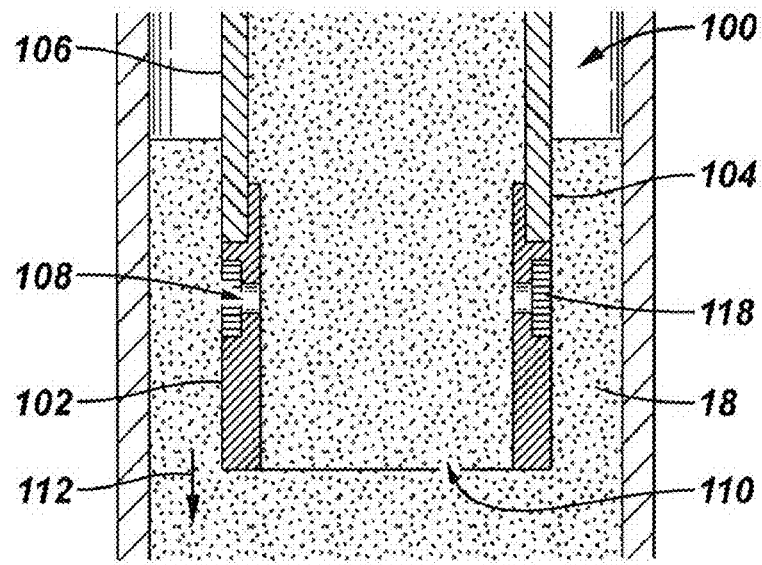
FIG. 8 is a schematic view of the example shown in FIG. 5 having filters disposed in the intakes.

FIGS. 6-8 depict another example of a fluid level detection device 100. A length of production tubing 106 is provided in the well annulus 18 and is operatively connected to the dewatering pump 20 to pump fluid from the well annulus 18. Fluid enters the production tubing 106 via a primary entry 110. A pipe extension 102 is coupled to the downhole end 104 of the length of production tubing 106 and includes intakes 108 at a location uphole of the primary entry 110. In this example, the controller 32 is configured to detect a change in operation of the dewatering pump 20 caused by gas entering the production tubing 106 via the intake 108 when the fluid level 109 (FIG. 7) in the well annulus 18 drops below the location of the intake 108 in the downhole direction 112. Preferably, the controller 32 is configured to change the speed of the dewatering pump 20 before the fluid level drops below the primary entry 110 in the downhole direction 112. Further, preferably the controller 32 is configured to monitor the amperage of a motor (not shown) driving the dewatering pump 20. When gas enters the production tubing 106 via the intake 108 (see arrows 111 in FIG. 7), the change in amperage of the motor is caused, which change is detectable by the controller 32.

FIG. 6 depicts the detection device 100 during normal operation when the fluid level 109 is located uphole of the intake 108. FIG. 7 depicts the detection device 100 wherein the fluid level 109 has dropped below the intake 108 in the downhole direction 112, thus allowing air to enter the intake 108 (arrows 111) causing the aforementioned change in operation of the dewatering pump 20, mainly change in amperage of a motor driving the dewatering pump 20. FIG. 8 depicts a filter 118 configured to filter flow of fluid through the intake 108. Although the example depicts the intake 108 formed in a pipe extension 102, it should be recognized that the intake 108 could be formed in the production tubing 106 or other structure located upstream of the dewatering pump 20.

Figure 9:
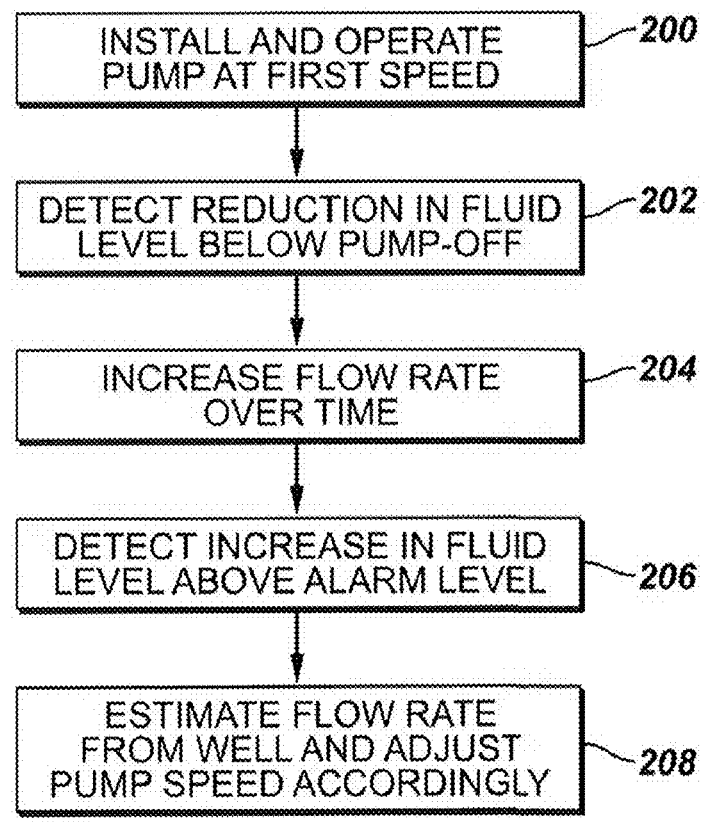
FIG. 9 is a flow chart showing one example of steps in a method of controlling a dewatering pump configured to dewater a gas well.
Figure 10:
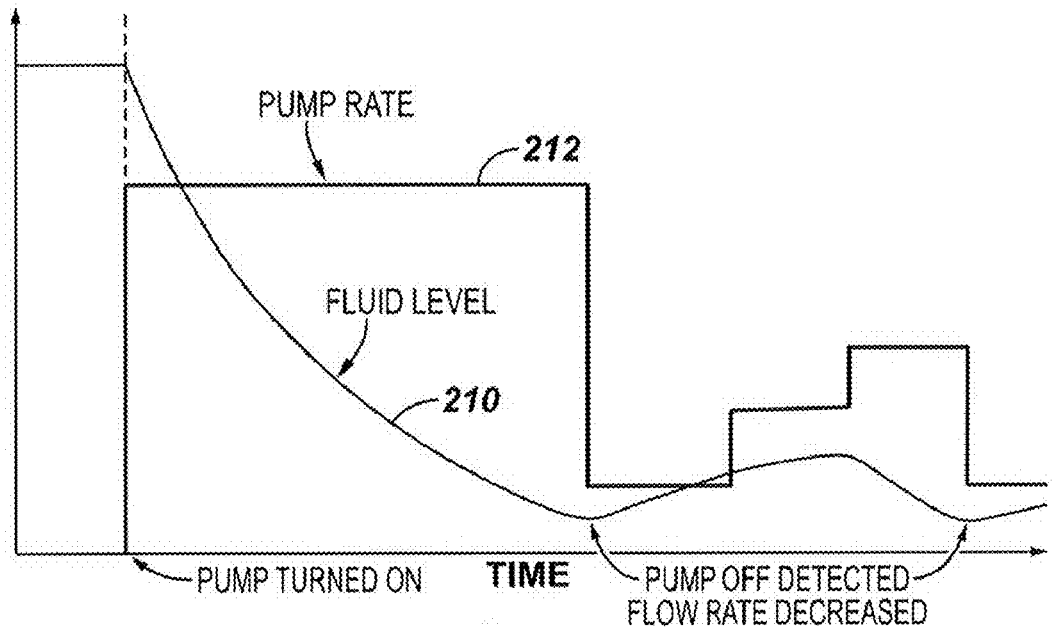
FIG. 10 is a graph showing two cycles followed according to the method shown in FIG. 9.

FIGS. 9 and 10 are schematic and graphical depictions of an exemplary method for controlling a dewatering pump configured to dewater a gas well. According to the example shown in FIG. 9, a dewatering pump is installed and operated at a first speed at step 200. Typically, the pump will operate at full speed (i.e. full flow rate) to pump out any liquid that has accumulated in the well annulus. At step 202, a fluid level detection device, such as one or more of the examples depicted in FIGS. 2-8, detects reduction in the fluid level below a predetermined pump off level. At step 204, the controller is configured to control the dewatering pump to slowly increase the speed (i.e. flow rate) over time as it searches for a preferred flow rate according to the below-described protocol. Once the pump flow rate increases past the well production rate, the fluid level detection device detects an increase in the fluid level above a predetermined alarm level, which causes the controller to again activate the dewatering pump (step 206). Based on the time interval between increases in speed and the amount of each speed increase, the controller is configured to estimate the liquid flow rate from the well and improve future search routines (step 208).

FIG. 8 depicts an illustration of how the above-described system works over time for two cycles. Line 210 depicts the fluid level and line 212 depicts pump rate.

Figure 11:
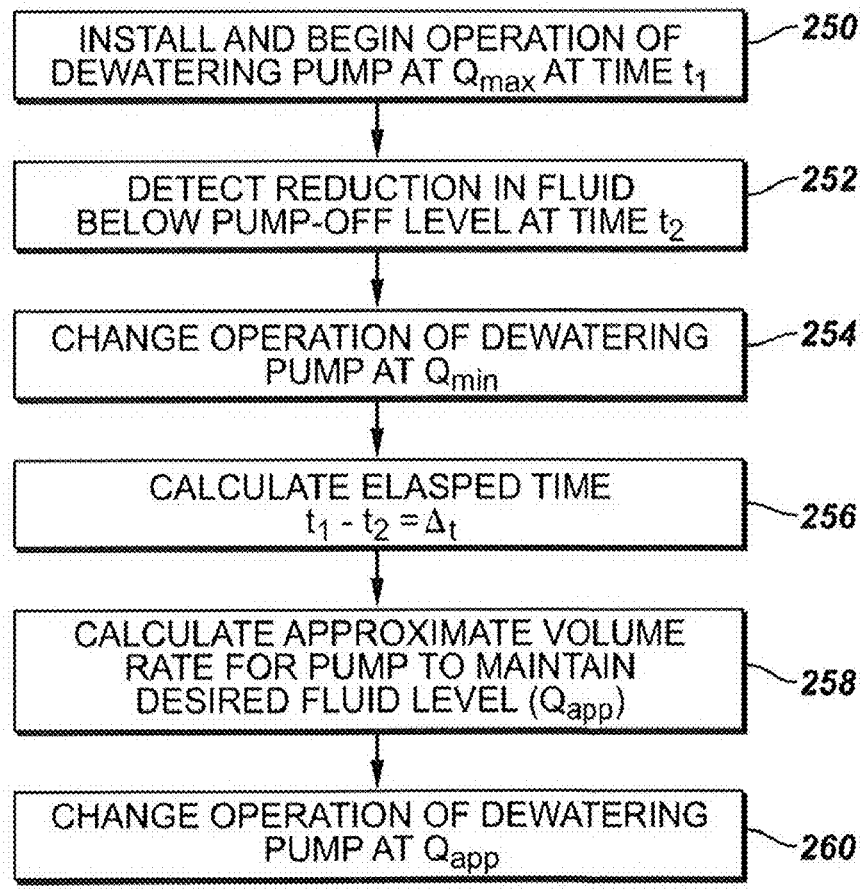
FIG. 11 is a flow chart showing another example of steps in a method for controlling a dewatering pump configured to dewater a gas well.

FIGS. 11 and 12 schematically and graphically depict another example of a method of controlling a dewatering pump configured to dewater a gas well. At step 250, a dewatering pump is installed in a gas well and operated initially at a predetermined pump flow rate (Qmax) at an initiation time ($t_1$). The fluid level in the well annulus is typically high at the initial installation. Therefore, Qmax is typically a high pumping rate (e.g. maximum volume capacity). At a later time ($t_2$), a fluid level detection device, such as one or more of the examples described hereinabove with reference to FIGS. 2-8 detects a reduction in fluid level to at or below a predetermined pump off level (step 252). Thereafter, at 254, the controller is configured to change operation of the dewatering pump to a lower pumping level (Qmin).

At step 256, the controller is configured to calculate the time elapsed between $T_1$ and $T_2$ according to the following formula:

$$t_1 - t_2 = \Delta t$$

At step 258, the controller is configured to calculate the approximate volume rate required for the pump to maintain a desired fluid level (Qapp) according to the following formula:

$$Qapp = (Q\max \Delta t - V) \div \Delta t$$

wherein V is the volume of fluid displaced by the pump between the times at $t_1$ and $t_2$, respectively.

At step 260, the controller resets the dewatering pump to the new pump speed Qapp.

FIG. 9 is a graph illustrating the first two cycles according to the above-described method. Line 262 is the fluid level and line 264 is the pump rate.

What is claimed is:

1. A monitoring and control system for a dewatering pump configured to dewater a gas well, the system comprising:
   a dewatering pump disposed in the gas well and operable at first and second speeds to pump fluid out of a well annulus wherein the dewatering pump draws fluid from the well annulus through production tubing extending downhole in the gas well;
   a fluid level detection device configured to identify a change of fluid level in the well annulus occurring between a first time period and a second, later time period wherein the fluid level detection device comprises at least one fluid level sensor wire disposed in the well annulus; and a controller configured to change the speed of the dewatering pump from the first speed to the second speed based upon the identified change in fluid level.

2. The system of claim 1, wherein the controller is configured to change the speed of the dewatering pump based upon the identified change in fluid level and the elapsed time ($\Delta t$) between the first time period and the second time period.

3. The control system according to claim 2, wherein the controller is further configured to operate the following protocol:
(a) identify the elapsed time ($\Delta t$) between the first time period and the second, later time period;
(b) identify the difference between the first speed and the second speed;
(c) calculate a preferred volume pumping rate based upon the elapsed time ($\Delta t$) and the difference between the first speed and the second speed;
(d) calculate a third speed for the dewatering pump necessary to achieve a preferred volume pumping rate to maintain a predetermined level of fluid in the well annulus; and
(e) operate the dewatering pump at the third speed.

4. The system according to claim 3, wherein the controller is further configured to repeat the protocol over time to further optimize volume pumping rate of the dewatering pump over time.

5. The system according to claim 1, wherein the first speed causes a first volume pumping rate (Qmax) of the dewatering pump and the second speed causes a second, lower volume pumping rate (Qmin) of the dewatering pump and wherein the controller is configured to calculate the volume (V) displaced by the dewatering pump during the interval between the first time period and the second time period.

6. The system according to claim 5, wherein the controller is further configured to calculate the approximate volume pumping rate (Qapp) necessary for the dewatering pump to maintain a preferred fluid level in the well annulus according to the following formula:

$$Qapp=(Qmax*\Delta t-V)/\Delta t.$$

7. The system according to claim 6, wherein the controller is configured to calculate a third speed for the dewatering pump necessary to achieve the approximate volume pumping rate (Qapp).

8. The system according to claim 7, wherein the controller is configured to operate the dewatering pump at the third speed.

9. The system according to claim 1, wherein the dewatering pump draws fluid from the well annulus through a primary entry of production tubing disposed in the well and wherein the fluid level detection device comprises an intake formed in the production tubing at a location uphole of the primary entry.

10. The system according to claim 9, wherein the controller is configured to detect a change in operation of the dewatering pump caused by gas entering the production tubing via the intake when the fluid level in the well annulus drops below the location of the intake in the downhole direction.

11. The system according to claim 10, wherein the controller is configured to change the speed of the dewatering pump to the second speed when the change in operation of the dewatering pump is detected.

12. The system according to claim 11, wherein the controller is configured to change the speed of the dewatering pump to the second speed before the fluid level drops below the primary entry in the downhole direction.

13. The system according to claim 11, wherein the controller is configured to monitor the amperage of a motor driving the dewatering pump, and wherein the gas entering the production tubing via the intake causes a change in amperage of the motor, which change is detectable by the controller and further wherein the controller is configured to change the speed of the dewatering pump to the second speed when the change in operation of the dewatering pump is detected.

14. The system according to claim 9, comprising a filter located on the intake and configured to filter flow of fluid through the intake.

15. The system according to claim 9, comprising a pipe extension coupled to a downhole end of the production tubing, wherein the intake is formed in the pipe extension.

16. The system according to claim 1, wherein the fluid level detection device comprises one fluid level sensor wire positioned in the well annulus and spaced apart from the production tubing, wherein a decrease in the fluid level in the well annulus from a location that is uphole of a non-insulated end of the fluid level sensor wire to a location that is downhole of the non-insulated end of the fluid level sensor wire opens a circuit formed between the fluid level sensor wire and the production tubing, which alerts the controller regarding the decrease in fluid level.

17. The system according to claim 16, wherein an increase in fluid level in the well annulus from a location that is downhole of the non-insulated end of the fluid level sensor wire to a location that is uphole of the non-insulated end of the fluid level sensor wire closes the circuit between the fluid level sensor wire and the production tubing, which alerts the controller regarding the increase in fluid level.

18. The system according to claim 1, wherein the fluid level detection device comprises two fluid level sensor wires having non-insulated ends that are substantially aligned in the downhole direction; and wherein a decrease in the fluid level in the well annulus from a location that is uphole of respective non-insulated ends of the two fluid level sensor wires to a location that is downhole of the respective non-insulated ends of the two fluid level sensor wires opens a circuit formed between the two fluid level sensor wires, which alerts the controller regarding the decrease in fluid level.

19. The system according to claim 18, wherein an increase in fluid level in the well annulus from a location that is downhole of the non-insulated ends of the fluid level sensor wires to a location that is uphole of the non-insulated ends of the fluid level sensor wires closes the circuit between the fluid level sensor wires, which alerts the controller regarding the increase in fluid level.

20. The system according to claim 1, wherein the fluid level detection device comprises two fluid level sensor wires including a first fluid level sensor wire having a non-insulated end and a second fluid level sensor wire having a non-insulated end, wherein the end of the first fluid level sensor wire is located uphole from the end of a second fluid level sensor wire; wherein a decrease in the fluid level in the well annulus from a location that is uphole of the end of the first fluid level sensor wire opens a circuit formed between the first fluid level sensor wire and the production tubing and wherein a further decrease in the fluid level in the well annulus to a location that is downhole of the end of the second fluid level sensor wire opens a circuit formed between the end of the second fluid level sensor wire and the production tubing.

21. The system according to claim 20, wherein the an increase in the fluid level in the well annulus to a location that is uphole of the end of the second fluid level sensor wire closes a circuit formed between the second fluid level sensor wire and the production tubing and wherein a further increase in the fluid level in the well annulus to a location that is uphole of the end of the first fluid level sensor wire closes a circuit formed between the end of the first fluid level sensor wire and the production tubing.

22. The system according to claim 1, wherein the at least one fluid level sensor wire that has a body portion that is insulated.

23. A method of monitoring and controlling a gas well dewatering pump, the method comprising:
configuring a storage medium wherein a set of executable code is stored;
executing the set of executable code with a controller to carry out:
operating a dewatering pump at a first speed to pump fluid out of a gas well annulus;
operating a fluid level detection device to identify a change of fluid level in the well annulus occurring between a first time period and a second, later time period;
operating a controller to change the speed of the dewatering pump from the first speed to a second speed based upon the identified change in fluid level;
operating the dewatering pump to draw fluid from the well annulus through production tubing extending downhole in the gas well;
providing one fluid level sensor wire positioned in the well annulus and spaced apart from the production tubing; and
alerting the controller when a circuit formed between an end of the fluid level sensor wire and the production tubing is opened by a decrease in water level in the well annulus.

24. The method of claim 23, further comprising changing the speed of the dewatering pump based upon the identified change in fluid level and the elapsed time ($\Delta t$) between the first time period and the second time period.

25. The method according to claim 23, further comprising:
identifying the elapsed time ($\Delta t$) between the first time period and the second, later time period;
identifying the difference between the first speed and the second speed;
calculating a preferred volume pumping rate based upon the elapsed time ($\Delta t$) and the difference between the first speed and the second speed;
calculating a third speed for the dewatering pump necessary to achieve the preferred volume pumping rate; and
operating the dewatering pump at the third speed.

26. The method according to claim 25, further comprising repeating the protocol over time to further optimize volume pumping rate over time.

27. The method according to claim 23, wherein the first speed causes a first volume pumping rate (Qmax) of the dewatering pump and the second speed causes a second, lower volume pumping rate (Qmin) of the dewatering pump and further comprising calculating the volume (V) displaced by the dewatering pump during the interval between the first time period and the second time period.

28. The method according to claim 27, further comprising calculating the approximate volume pumping rate (Qapp) necessary for the dewatering pump to maintain a preferred fluid level in the well annulus according to the following formula:

$$Qapp=(Qmax*\Delta t-V)/\Delta t.$$

29. The method according to claim 28, comprising calculating a third speed for the dewatering pump necessary to achieve the approximate volume pumping rate (Qapp).

30. The method according to claim 29, comprising operating the dewatering pump at the third speed.

31. The method according to claim 23, wherein the dewatering pump draws fluid from the well annulus through a primary entry of the production tubing disposed in the well and wherein the fluid level detection device comprises an intake formed in the production tubing at a location uphole of the primary entry.

32. The method according to claim 31, comprising detecting a change in operation of the dewatering pump caused by gas entering the production tubing via the intake when the fluid level in the well annulus drops below the location of the intake in the downhole direction.

33. The method according to claim 32, comprising changing the speed of the dewatering pump to the second speed when the change in operation of the dewatering pump is detected.

34. The method according to claim 33, comprising changing the speed of the dewatering pump before the fluid level drops below the primary entry in the downhole direction.

35. The method according to claim 33, comprising monitoring the amperage of a motor driving the dewatering pump, and wherein the gas entering the production tubing causes a change in amperage of the motor.

36. The method according to claim 33, comprising filtering fluid flowing through the intake.

37. The method according to claim 23, comprising alerting the controller when the circuit formed between an end of the fluid level sensor wire and the production tubing is closed by an increase in water level in the well annulus.

38. The method according to claim 23, comprising providing two fluid level sensor wires having ends that are substantially aligned in the downhole direction; and alerting the controller when a circuit formed between two fluid level sensor wires is opened by a decrease in water level in the well annulus.

39. The method according to claim 38, comprising alerting the controller when the circuit formed between the fluid level sensor wires is closed by an increase in water level in the annulus.

40. The method according to claim 23, comprising providing two fluid level sensor wires including a first fluid level sensor wire having an end and a second fluid level sensor wire having an end, wherein the end of the first fluid level sensor wire is located uphole from the end of a second fluid level sensor wire and alerting the controller when a decrease in the fluid level in the well annulus from a location that is uphole of the end of the first fluid level sensor wire opens a circuit formed between the first fluid level sensor wire and the production tubing and further alerting the controller when a further decrease in the fluid level in the well annulus to a location that is downhole of the end of the second fluid level sensor wire opens a circuit formed between the end of the second fluid level sensor wire and the production tubing.

41. The method according to claim 40, comprising alerting the controller when an increase in the fluid level in the well annulus to a location that is uphole of the end of the second fluid level sensor wire closes a circuit formed between the second fluid level sensor wire and the production tubing and alerting the controller when a further increase in the fluid level in the well annulus to a location that is uphole of the end of the first fluid level sensor wire closes a circuit formed between the end of the first fluid level sensor wire and the production tubing.

42. A monitoring and control system for a dewatering pump configured to dewater a gas well, the system comprising:

a dewatering pump disposed in the gas well and operable at first and second speeds to pump fluid out of a well annulus;
a fluid level detection device configured to identify a change of fluid level in the well annulus occurring between a first time period and a second, later time period; and
a controller configured to change the speed of the dewatering pump from the first speed to the second speed based upon the identified change in fluid level,
wherein the dewatering pump draws fluid from the well annulus through a primary entry of production tubing disposed in the well,
wherein the fluid level detection device comprises an intake formed in the production tubing at a location uphole of the primary entry, and
wherein the controller is configured to detect a change in operation of the dewatering pump caused by gas entering the production tubing via the intake when the fluid level in the well annulus drops below the location of the intake in the downhole direction.

43. The system according to claim 42, wherein the controller is configured to change the speed of the dewatering pump to the second speed when the change in operation of the dewatering pump is detected.

44. The system according to claim 43, wherein the controller is configured to change the speed of the dewatering pump to the second speed before the fluid level drops below the primary entry in the downhole direction.

45. The system according to claim 43, wherein the controller is configured to monitor the amperage of a motor driving the dewatering pump, and wherein the gas entering the production tubing via the intake causes a change in amperage of the motor, which change is detectable by the controller and further wherein the controller is configured to change the speed of the dewatering pump to the second speed when the change in operation of the dewatering pump is detected.

46. The system according to claim 42, comprising a filter located on the intake and configured to filter flow of fluid through the intake.

47. The system according to claim 42, comprising a pipe extension coupled to a downhole end of the production tubing, wherein the intake is formed in the pipe extension.

48. A monitoring and control system for a dewatering pump configured to dewater a gas well, the system comprising:
a dewatering pump disposed in the gas well and operable at first and second speeds to pump fluid out of a well annulus;
a fluid level detection device configured to identify a change of fluid level in the well annulus occurring between a first time period and a second, later time period; and
a controller configured to change the speed of the dewatering pump from the first speed to the second speed based upon the identified change in fluid level,
wherein the first speed causes a first volume pumping rate (Qmax) of the dewatering pump and the second speed causes a second, lower volume pumping rate (Qmin) of the dewatering pump, and
wherein the controller is configured to calculate the volume (V) displaced by the dewatering pump during the interval between the first time period and the second time period.

49. A method of monitoring and controlling a gas well dewatering pump, the method comprising:
configuring a storage medium wherein a set of executable code is stored;
executing the set of executable code with a controller to carry out:
operating a dewatering pump at a first speed to pump fluid out of a gas well annulus wherein the dewatering pump draws fluid from the well annulus through a primary entry of production tubing disposed in the well;
operating a fluid level detection device to identify a change of fluid level in the well annulus occurring between a first time period and a second, later time period wherein the fluid level detection device comprises an intake formed in the production tubing at a location uphole of the primary entry;
operating a controller to change the speed of the dewatering pump from the first speed to a second speed based upon the identified change in fluid level; and
detecting a change in operation of the dewatering pump caused by gas entering the production tubing via the intake when the fluid level in the well annulus drops below the location of the intake in the downhole direction.

50. The method according to claim 49, comprising changing the speed of the dewatering pump to the second speed when the change in operation of the dewatering pump is detected.

51. The method according to claim 50, comprising changing the speed of the dewatering pump before the fluid level drops below the primary entry in the downhole direction.

52. The method according to claim 50, comprising monitoring the amperage of a motor driving the dewatering pump, and wherein the gas entering the production tubing causes a change in amperage of the motor.

53. The method according to claim 49, comprising filtering fluid flowing through the intake.

54. A method of monitoring and controlling a gas well dewatering pump, the method comprising:
configuring a storage medium wherein a set of executable code is stored;
executing the set of executable code with a controller to carry out:
operating a dewatering pump at a first speed to pump fluid out of a gas well annulus;
operating a fluid level detection device to identify a change of fluid level in the well annulus occurring between a first time period and a second, later time period;
operating a controller to change the speed of the dewatering pump from the first speed to a second speed based upon the identified change in fluid level, wherein the first speed causes a first volume pumping rate (Qmax) of the dewatering pump and the second speed causes a second, lower volume pumping rate (Qmin) of the dewatering pump; and
calculating the volume (V) displaced by the dewatering pump during the interval between the first time period and the second time period.

* * * * *